US012695734B2

(12) United States Patent
Zheng et al.

(10) Patent No.: US 12,695,734 B2
(45) Date of Patent: Jul. 28, 2026

(54) DATA PROCESSING METHODS, APPARATUSES, AND DEVICES

(71) Applicant: ALIPAY (HANGZHOU) INFORMATION TECHNOLOGY CO., LTD., Hangzhou (CN)

(72) Inventors: Xianyi Zheng, Hangzhou (CN); Xiaofei Wan, Hangzhou (CN); Zhi Xin, Hangzhou (CN); Dengwei Xu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 445 days.

(21) Appl. No.: 18/322,387

(22) Filed: May 23, 2023

(65) Prior Publication Data

US 2023/0388279 A1 Nov. 30, 2023

(30) Foreign Application Priority Data

May 31, 2022 (CN) .......................... 202210611945.1

(51) Int. Cl.
*H04L 9/40* (2022.01)

(52) U.S. Cl.
CPC ........ *H04L 63/0435* (2013.01); *H04L 63/062* (2013.01); *H04L 63/0823* (2013.01)

(58) Field of Classification Search
CPC ............... H04L 63/0435; H04L 63/062; H04L 63/0823; H04L 63/0428; H04L 63/0442; H04L 63/0869
See application file for complete search history.

(56) References Cited

U.S. PATENT DOCUMENTS

2009/0089575 A1* 4/2009 Yonezawa .............. G06Q 10/06
380/44
2014/0317686 A1* 10/2014 Vetillard ................. G06F 21/74
726/2
(Continued)

FOREIGN PATENT DOCUMENTS

CN 106102054 A 11/2016
CN 108650219 A 10/2018
(Continued)

OTHER PUBLICATIONS

Extended European Search Report in European Appln. No. 23176363. 2, mailed on Nov. 8, 2023, 8 pages.

*Primary Examiner* — Dhairya A Patel
*Assistant Examiner* — Eui H Kim
(74) *Attorney, Agent, or Firm* — Fish & Richardson P.C.

(57) ABSTRACT

Data processing includes acquiring service data of a target service by using a trusted application in a trusted execution environment (TEE), generating a service session key corresponding to the target service, and transferring the service data and the service session key to a secure element and encrypted based on the service session key to obtain service ciphertext information, and encrypting the service session key based on a target service key to obtain a service session key ciphertext. A key identifier of the target service key, the service ciphertext information, and the service session key ciphertext are sent to a server device to determine the target service key, which is used to decrypt the service session key ciphertext to obtain the service session key, which is used to decrypt the service ciphertext information to obtain the service data of the target service to perform target service processing.

20 Claims, 10 Drawing Sheets

(56)          References Cited

U.S. PATENT DOCUMENTS

| | | | |
|---|---|---|---|
| 2014/0324698 A1* | 10/2014 | Dolcino | G06Q 20/353 |
| | | | 705/44 |
| 2015/0365231 A1* | 12/2015 | Warnez | H04W 12/041 |
| | | | 380/44 |
| 2015/0371226 A1* | 12/2015 | Hurley | G06Q 20/40 |
| | | | 705/64 |
| 2016/0234176 A1* | 8/2016 | Chu | H04L 63/04 |
| 2017/0310647 A1* | 10/2017 | Hu | G06F 21/33 |
| 2018/0167367 A1* | 6/2018 | John | H04L 9/0825 |
| 2019/0173672 A1 | 6/2019 | Saint et al. | |
| 2019/0182236 A1* | 6/2019 | Rangaraj | H04L 9/3239 |
| 2020/0021445 A1* | 1/2020 | Caceres | G06F 21/44 |
| 2020/0127819 A1 | 4/2020 | O'Toole | |

FOREIGN PATENT DOCUMENTS

| | | | |
|---|---|---|---|
| CN | 111274611 A | 6/2020 |
| CN | 112329071 A | 2/2021 |
| EP | 3748902 | 12/2020 |
| WO | 2019109852 A1 | 6/2019 |

* cited by examiner

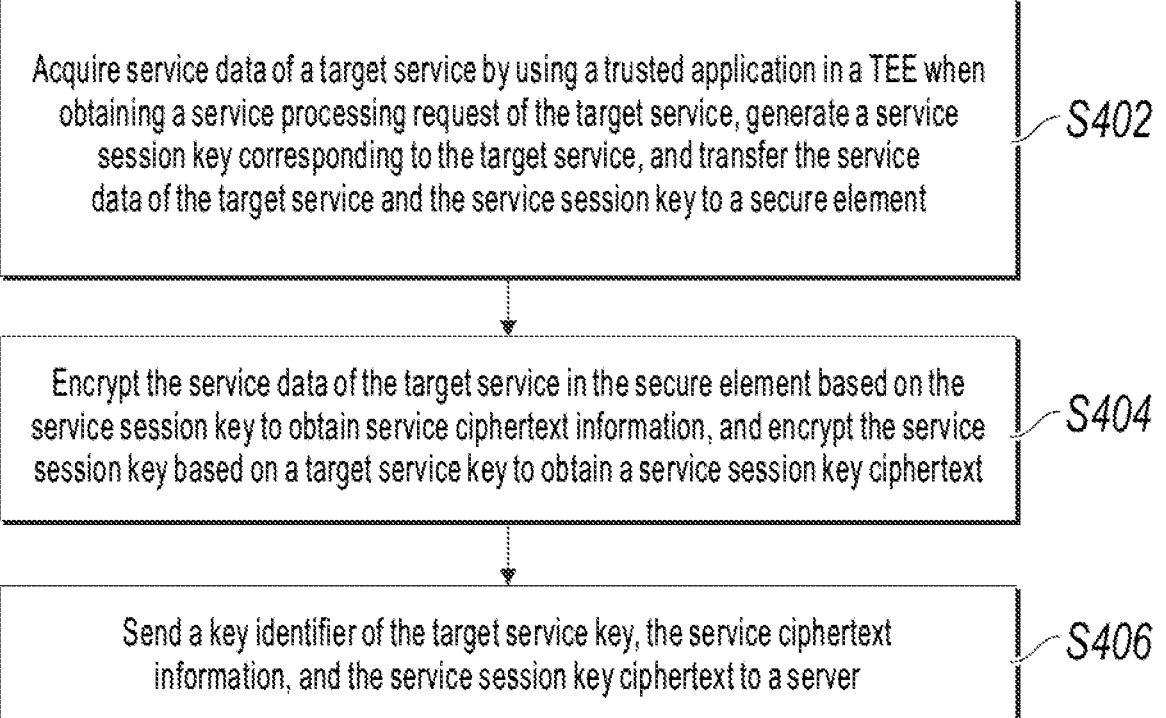

Acquire service data of a target service by using a trusted application in a TEE when obtaining a service processing request of the target service, generate a service session key corresponding to the target service, and transfer the service data of the target service and the service session key to a secure element     S402

Encrypt the service data of the target service in the secure element based on the service session key to obtain service ciphertext information, and encrypt the service session key based on a target service key to obtain a service session key ciphertext     S404

Send a key identifier of the target service key, the service ciphertext information, and the service session key ciphertext to a server     S406

DATA PROCESSING METHODS, APPARATUSES, AND DEVICES

CROSS-REFERENCE TO RELATED APPLICATIONS

This application claims priority to Chinese Patent Application No. 202210611945.1, filed on May 31, 2022, which is hereby incorporated by reference in its entirety.

TECHNICAL FIELD

This specification relates to the field of data processing technologies, and in particular, to data processing methods, apparatuses, and devices.

BACKGROUND

With the continuous development of computer technologies, terminal devices have become necessities in people's life and work and the terminal devices can provide more services for users. How to ensure data security of service interaction between a terminal device and a server attracts attention and concern of various organizations.

The terminal device and the server can interact with each other by negotiating a key to encrypt service data, and process a service. However, such a method is prone to a risk of key leakage, which leads to leakage of the service data. As a result, there is a great potential security hazard in the transmission and processing of the service data. Therefore, there is a need to provide a solution capable of improving security of service data during transmission and processing.

SUMMARY

Some embodiments of this specification are intended to provide a solution capable of improving security of service data during transmission and processing.

To implement the above-mentioned technical solution, some embodiments of this specification are described as follows:

According to a first aspect, some embodiments of this specification provide a data processing method, including: establishing a secure channel with a secure element of a terminal device based on the same channel establishment rule as that of the secure element of the terminal device; sending a service key and an identifier of the service key to the terminal device through the secure channel, where the service key and the identifier of the service key are used to trigger the terminal device to store the service key and the identifier of the service key in the secure element of the terminal device through a trusted execution environment (TEE); receiving a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and determining the target service key based on the key identifier of the target service key, obtaining the service session key based on the target service key and the service session key ciphertext, and obtaining the service data of the target service based on the service session key and the service ciphertext information so as to perform service processing on the target service based on the service data of the target service.

According to a second aspect, some embodiments of this specification provide a data processing method, which is applied to a terminal device. The terminal device includes a trusted execution environment (TEE) and an encryption hardware-based secure element. The method includes: acquiring service data of the target service by using a trusted application in the TEE when obtaining a service processing request of the target service, generating a service session key corresponding to the target service, and transferring the service data of the target service and the service session key to the secure element; encrypting the service data of the target service in the secure element based on the service session key to obtain service ciphertext information, and encrypting the service session key based on a target service key to obtain a service session key ciphertext, where the target service key and a key identifier of the target service key are received by the terminal device from a server through a secure channel and transferred to the secure element through the TEE, and the secure channel is a channel established between the secure element of the terminal device and the server based on the same channel establishment rule as that of the server; and sending the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service.

According to a third aspect, some embodiments of this specification provide a data processing apparatus, including: a channel establishment module, configured to establish a secure channel with a secure element of a terminal device based on the same channel establishment rule as that of the secure element of the terminal device; a data sending module, configured to send a service key and an identifier of the service key to the terminal device through the secure channel, where the service key and the identifier of the service key are used to trigger the terminal device to store the service key and the identifier of the service key in the secure element of the terminal device through a TEE; a data receiving module, configured to receive a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and a service processing module, configured to determine the target service key based on the key identifier of the target service key, obtain the service session key based on the target service key and the service session key ciphertext, and obtain the service data of the target service based on the service session key and the service ciphertext information so as to perform service processing on the target service based on the service data of the target service.

According to a fourth aspect, some embodiments of this specification provide a data processing apparatus. The data processing apparatus includes a trusted execution environment (TEE) and an encryption hardware-based secure element. The method includes: a data acquisition module, configured to acquire service data of the target service by using a trusted application in the TEE when obtaining a service processing request of the target service, generate a service session key corresponding to the target service, and transfer the service data of the target service and the service session key to the secure element; a data processing module, configured to encrypt the service data of the target service in the secure element based on the service session key to obtain service ciphertext information, and encrypt the service session key based on a target service key to obtain a service session key ciphertext, where the target service key and a key identifier of the target service key are received by the data processing apparatus from a server through a secure channel and transferred to the secure element through the TEE, and the secure channel is a channel established between the secure element of the data processing apparatus and the server based on the same channel establishment rule as that of the server; and a data sending module, configured to send the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service.

According to a fifth aspect, some embodiments of this specification provide a data processing device. The data processing device includes: a processor; and a memory configured to store a computer-executable instruction, where when the executable instruction is executed, the processor is enabled to: establish a secure channel with a secure element of a terminal device based on the same channel establishment rule as that of the secure element of the terminal device; send a service key and an identifier of the service key to the terminal device through the secure channel, where the service key and the identifier of the service key are used to trigger the terminal device to store the service key and the identifier of the service key in the secure element of the terminal device through a TEE; receive a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and determine the target service key based on the key identifier of the target service key, obtain the service session key based on the target service key and the service session key ciphertext, and obtain the service data of the target service based on the service session key and the service ciphertext information so as to perform service processing on the target service based on the service data of the target service.

According to a sixth aspect, some embodiments of this specification provide a data processing device. The data processing device includes a trusted execution environment (TEE) and an encryption hardware-based secure element. The data processing device includes: a processor; and a memory configured to store a computer-executable instruction, where when the executable instruction is executed, the processor is enabled to: acquire service data of the target service by using a trusted application in the TEE when obtaining a service processing request of the target service, generate a service session key corresponding to the target service, and transfer the service data of the target service and the service session key to the secure element; encrypt the service data of the target service in the secure element based on the service session key to obtain service ciphertext information, and encrypt the service session key based on a target service key to obtain a service session key ciphertext, where the target service key and a key identifier of the target service key are received by the data processing device from a server through a secure channel and transferred to the secure element through the TEE, and the secure channel is a channel established between the secure element of the data processing device and the server based on the same channel establishment rule as that of the server; and send the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service.

According to a seventh aspect, some embodiments of this specification provide a storage medium, where the storage medium is configured to store a computer-executable instruction, and the executable instruction is executed to implement the following procedure: establishing a secure channel with a secure element of a terminal device based on the same channel establishment rule as that of the secure element of the terminal device; sending a service key and an identifier of the service key to the terminal device through the secure channel, where the service key and the identifier of the service key are used to trigger the terminal device to store the service key and the identifier of the service key in the secure element of the terminal device through a TEE; receiving a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and determining the target service key based on the key identifier of the target service key, obtaining the service session key based on the target service key and the service session key ciphertext, and obtaining the service data of the target service based on the service session key and the service ciphertext information so as to perform service processing on the target service based on the service data of the target service.

According to an eighth aspect, some embodiments of this specification provide a storage medium, where the storage medium is configured to store a computer-executable instruction, and the executable instruction is executed to implement the following procedure: acquiring service data of the target service by using a trusted application in the TEE when obtaining a service processing request of the target service, generating a service session key corresponding to the target service, and transferring the service data of the target service and the service session key to the secure element; encrypting the service data of the target service in the secure element based on the service session key to obtain service ciphertext information, and encrypting the service session key based on a target service key to obtain a service session key ciphertext, where the target service key and a key identifier of the target service key are received by the terminal device from a server through a secure channel and transferred to the secure element through the TEE, and the secure channel is a channel established between the secure element of the terminal device and the server based on the same channel establishment rule as that of the server; and sending the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service.

BRIEF DESCRIPTION OF DRAWINGS

To describe the technical solutions in some embodiments of this specification or in an existing technology more clearly, the following briefly describes the accompanying drawings needed for describing some embodiments or the existing technology. Clearly, the accompanying drawings in the following descriptions merely show some embodiments of this specification, and a person of ordinary skill in the art can still derive other drawings from these accompanying drawings without creative efforts.

FIG. 4A is a flowchart illustrating another data processing method, according to some embodiments of this specification;

DESCRIPTION OF EMBODIMENTS

Some embodiments of this specification provide data processing methods, apparatuses, and devices.

To make a person skilled in the art better understand the technical solutions in this specification, the following clearly and fully describes the technical solutions in some embodiments of this specification with reference to the accompanying drawings in some embodiments of this specification. Clearly, the described embodiments are merely some but not all of the embodiments of this specification. All other embodiments obtained by a person of ordinary skill in the art based on some embodiments of this specification without creative efforts shall fall within the protection scope of this specification.

Embodiment 1

Figure 1A:
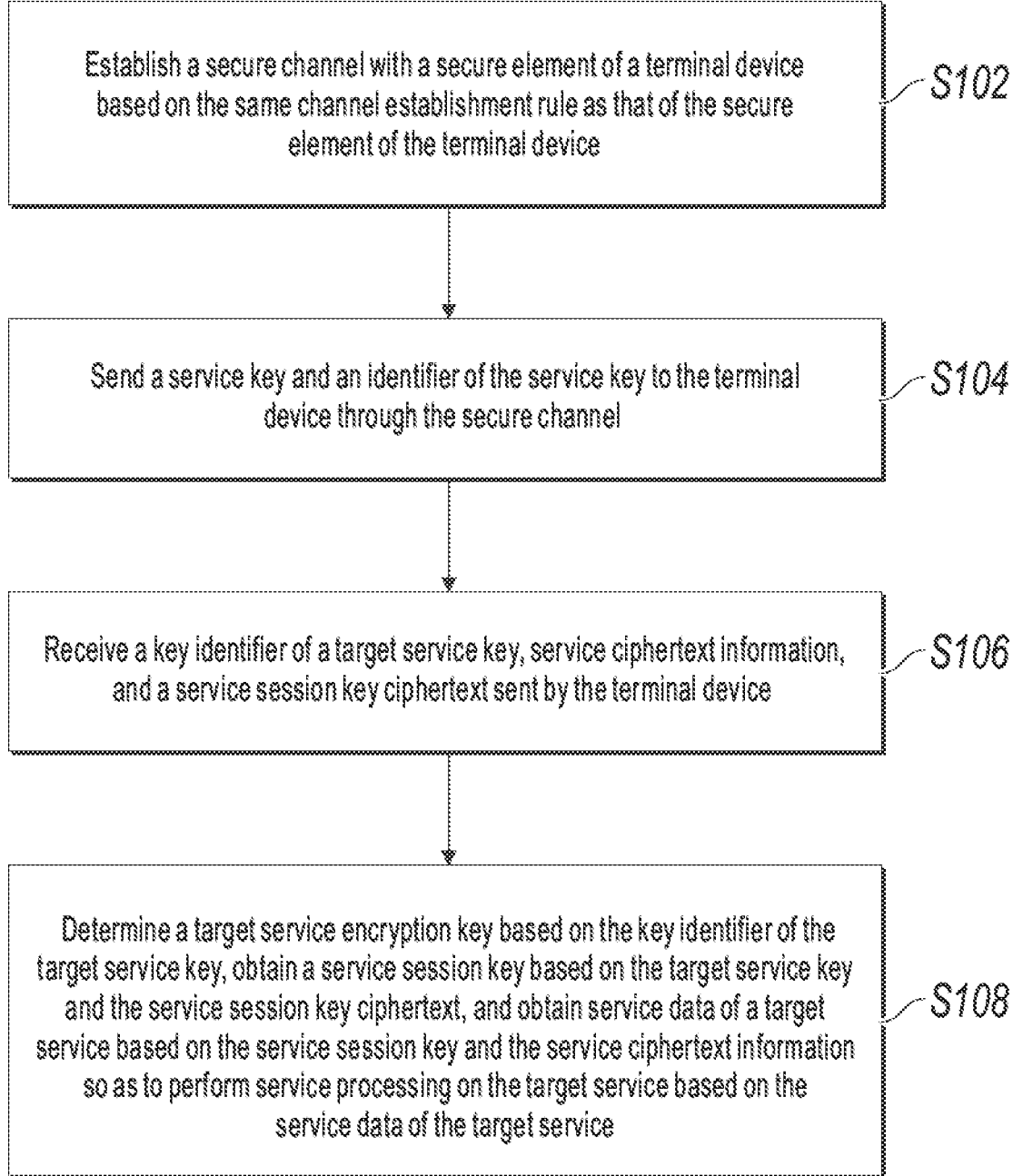
FIG. 1A is a flowchart illustrating a data processing method, according to some embodiments of this specification.
Figure 1B:
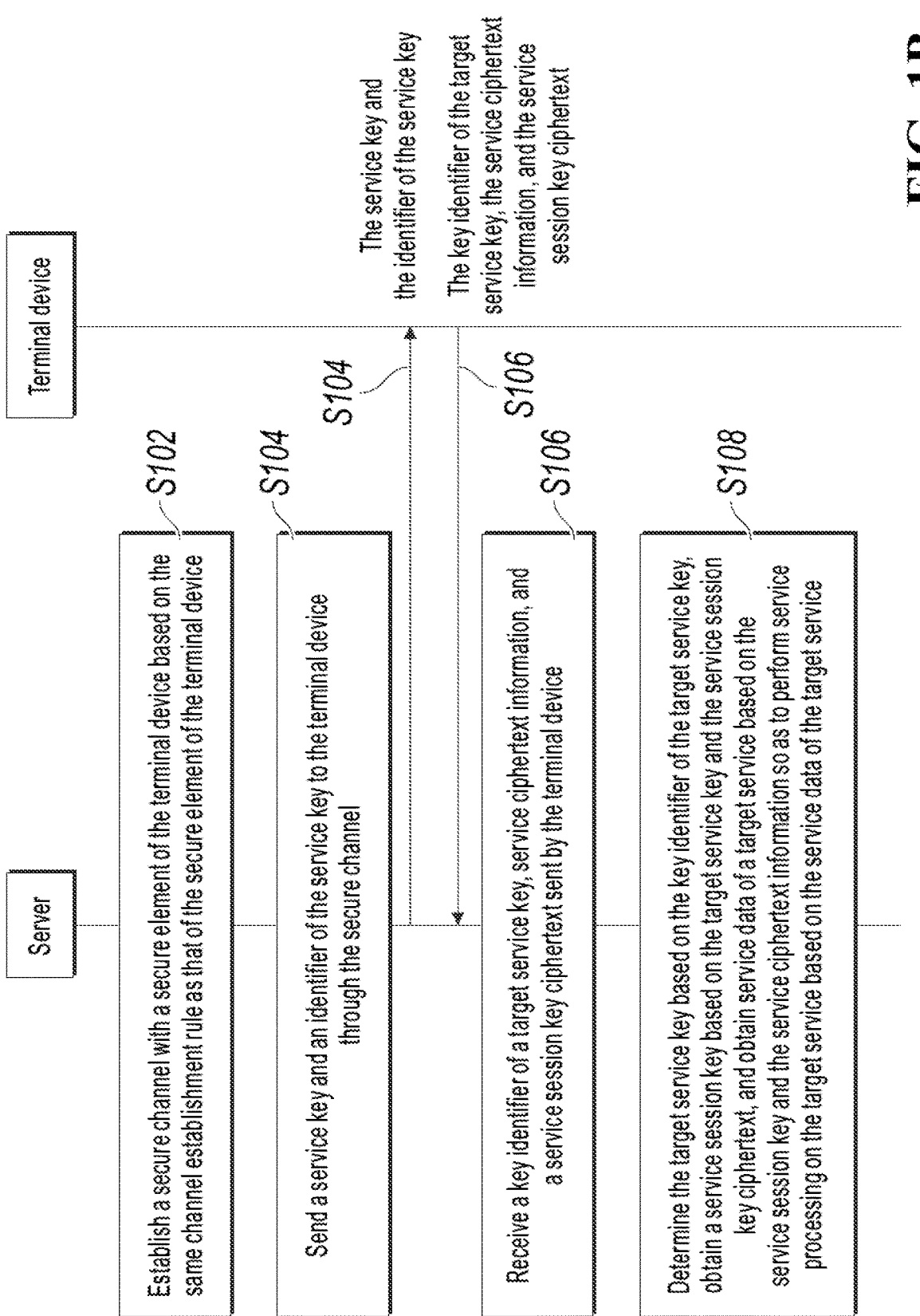
FIG. 1B is a schematic diagram illustrating a processing procedure of a data processing method, according to this specification.

As shown in FIG. 1A and FIG. 1B, some embodiments of this specification provide data processing methods. The method can be performed by a server, and the server can be a standalone server, or a server cluster that includes a plurality of servers. The method can specifically include the following steps:

S102: Establish a secure channel with a secure element of a terminal device based on the same channel establishment rule as that of the secure element of the terminal device.

Figure 2:
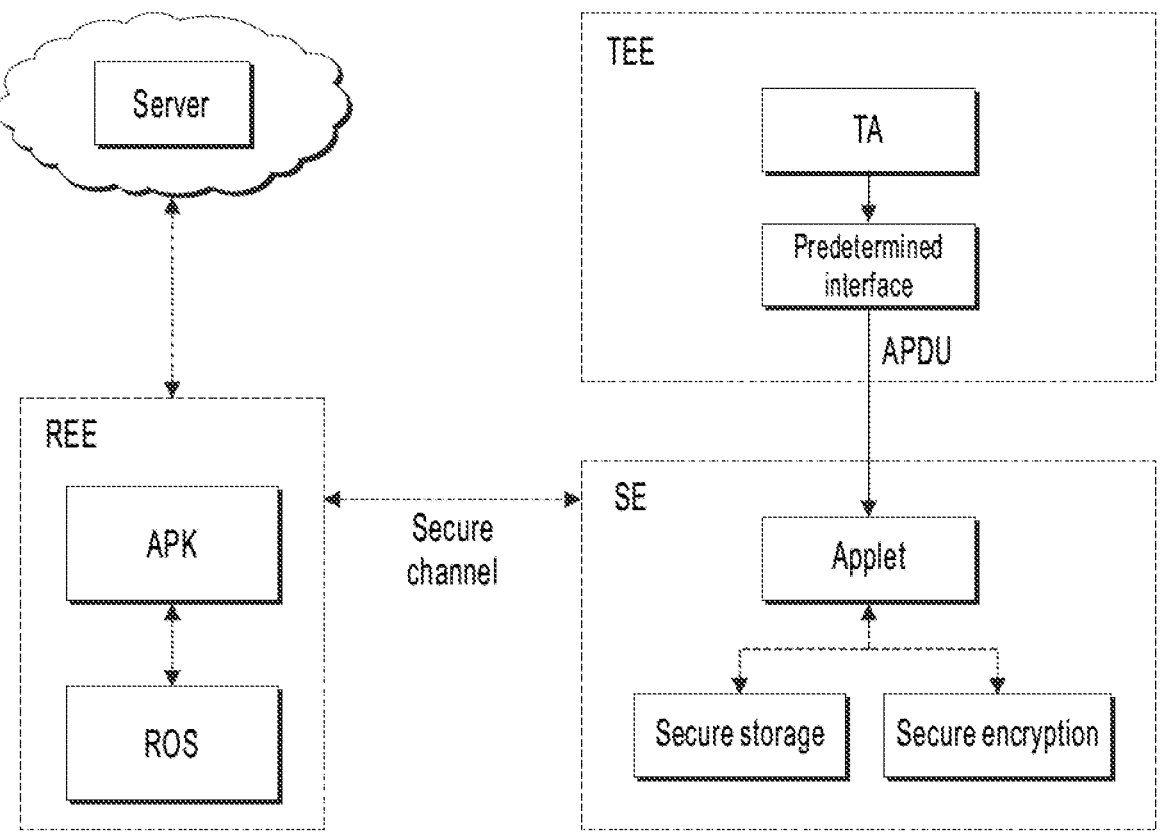
FIG. 2 is a schematic diagram illustrating establishment of a secure channel, according to this specification.

As shown in FIG. 2, the terminal device can include a trusted execution environment (TEE) and an encryption hardware-based secure element. The TEE can be a secure area separated from a rich execution environment (REE) on a digital processor (such as a CPU) of the terminal device. The TEE includes a trusted application (TA) and a trusted operating system (TOS). The TEE is separated from the REE and applications of the REE so that sensitive data are stored, processed, and protected in a trusted environment so as to ensure confidentiality and integrity of data and code. In addition, the TEE provides a secure execution environment for a client application (CA) loaded therein to implement data processing related to security and privacy, such as secure storage and secure computing. The TEE runs concurrently with the REE and can interact with the REE through a secure API. The encryption hardware-based secure element is a general term of a hardware secure element embedded with a microchip, and is a small-sized operation and storage communication entity that can operate independently, including but not limited to a secure element (SE). The SE is generally provided in the form of a chip, and includes an encryption/decryption logic circuit to prevent external malicious parsing and attacking and protect data security. The SE is a high-security hardware component that can implement storage and cryptographic operations of sensitive data such as a key, or can be a secure mode integrating software and hardware and related protocols, or can be an embedded smart card-level application program. The SE includes an eSE, an inSE, etc. The applet is a program running in the SE, and a secure application running in the SE. For example, an SE applet such as a resource transfer application can be installed in the SE of the terminal device. It is worthwhile to note that the secure element is an environment in which data are encrypted and protected based on hardware, and the TEE cannot provide a secure key storage and key running environment at a hardware isolation level. Therefore, the secure element has a higher security level than the TEE.

In some implementations, with the continuous development of computer technologies, terminal devices have become necessities in people's life and work and the terminal devices can provide more services for users. How to ensure data security of service interaction between a terminal device and a server attracts attention and concern of various organizations. The terminal device and the server can interact with each other by deploying a key in advance to encrypt service data, and process a service. For example, when deploying a key needed for transmitting the service data, the server can negotiate with the trusted execution environment (TEE) provided in the terminal device to determine the symmetric key. However, such a method is prone to a risk of leakage of the symmetric key, which leads to leakage of the service data. As a result, there is a great potential security hazard in the transmission and processing of the service data. Therefore, there is a need to provide a solution capable of improving security of service data during transmission and processing. In view of the previous description, some embodiments of this specification provide a technical solution capable of alleviating the above-mentioned problems. References can be made to the following description for details.

The server can receive a device authentication request of the terminal device, where the device authentication request can include device authentication information (used to represent a device identity of the terminal device) of the terminal device. The server can perform device authentication on the terminal device based on the device authentication information, and after the device authentication is completed, acquire the same channel establishment rule as that of the terminal device and establish a secure channel with the terminal device.

The above-mentioned method for performing device authentication on the terminal device is an optional and implementable authentication method. In some actual application scenarios, there can be a plurality of different device authentication methods, which are not specifically limited in some embodiments of this specification. In addition, there can be a plurality of methods for obtaining the same channel establishment rule between the server and the terminal device. For example, the TEE of the terminal device can send a plurality of different channel establishment rules to the server, and the server can select one target channel establishment rule from the channel establishment rules and encrypt the target channel establishment rule. The terminal device can decrypt the encrypted target channel establishment rule to obtain the target channel establishment rule. The terminal device can establish a secure channel with the server based on the target channel establishment rule. At the same time, the server can also establish a secure channel with the terminal device based on the target channel establishment rule.

As shown in FIG. 2, the TEE can establish a secure channel with the REE and exchange information with the REE through the secure channel, and then the REE exchanges information with the server, thereby establishing a secure channel between the TEE and the server, and implementing secure transmission of information exchanged between the TEE and the server. In addition, the TA in the TEE can perform security authentication with the SE, and after the security authentication succeeds, the trusted application (TA) implements access control for the applet in the SE. For example, the TA can send an instruction to the applet in the SE through a predetermined interface to implement access control. The instruction transmitted between the TA and the SE can have multiple types. For example, the instruction can be an application protocol data unit (APDU) instruction, and the APDU is an information unit between a smart card and a smart card read/write device. Finally, a secure channel is established between the SE and the server.

S104: Send a service key and an identifier of the service key to the terminal device through the secure channel.

The service key and the identifier of the service key can be used to trigger the terminal device to store the service key and the identifier of the service key in the secure element of the terminal device through the TEE. The service key can be a key (such as a symmetric key) or one or more pairs of keys (such as asymmetric keys). For example, the server can send an encryption key in the service key and an identifier of the service key to the terminal device through the secure channel, and can trigger the terminal device to encrypt the data by using the encryption key in the service key.

In some implementations, the server can process a plurality of different services, and a plurality of service keys of different services may be stored in the server. Therefore, the server can send a plurality of different service keys and corresponding identifiers of the service keys to the terminal device through the secure channel.

In addition, the server can receive a service identifier, sent by the terminal device through the secure channel, of a target service to be processed, and the server can determine a corresponding target service key and an identifier of the target service key based on the service identifier of the target service, and then send the target service key and the identifier of the target service key to the terminal device through the secure channel.

S106: Receive a key identifier of a target service key, service ciphertext information, and a service session key ciphertext sent by the terminal device.

The service ciphertext information can be obtained by the terminal device by encrypting service data of a target service in a secure element based on a service session key. The target service can be a service requested by a user. In practice, the target service can include a plurality of types, such as a resource transfer service and a privacy risk control service. The service data of the target service can be service data needed for processing the target service. If the target service is a resource transfer service, the service data of the target service can include a resource transfer quantity, a resource transfer time, a resource transfer target, etc. The service session key ciphertext can be obtained by the terminal device by encrypting a service session key in the secure element based on the target service key. The service session key can be a key corresponding to the target service generated by the terminal device in a TEE. The service session key can be a key corresponding to the target service randomly generated by the terminal device in the TEE, that is, "one-time pad" can be implemented using the service session key, thereby ensuring security of data in the transmission process.

S108: Determine the target service key based on the key identifier of the target service key, obtain the service session key based on the target service key and the service session key ciphertext, and obtain the service data of the target service based on the service session key and the service ciphertext information so as to perform service processing on the target service based on the service data of the target service.

In some implementations, the server can determine the target service key corresponding to the target service based on the received key identifier of the target service key, and then decrypt the service session key ciphertext by using the target service key to obtain the service session key. Then, the server decrypts the service ciphertext information by using the service session key to obtain the service data of the target service. Finally, the server can perform service processing on the target service based on the service data of the target service. As such, dual protection for the service data of the target service can be implemented using the service session key and the target service key, thereby improving the security of the service data of the target service in the data transmission process.

If the service key is a pair of asymmetric keys (i.e., including a public key and a private key), the server can determine the service key corresponding to the key identifier based on the key identifier of the target service key, and decrypt the service session key ciphertext by using the private key in the service key to obtain the service session key. If the service key is a symmetric key, the server can directly decrypt the service session key ciphertext by using the service key to obtain the service session key after determining the service key corresponding to the key identifier based on the key identifier of the target service key. The service session key can be a symmetric key, that is, the data can be encrypted using the service session key, or the data can be decrypted using the service session key.

Some embodiments of this specification provide data processing methods. The method includes: establishing a secure channel with a secure element of a terminal device based on the same channel establishment rule as that of the secure element of the terminal device; sending a service key and an identifier of the service key to the terminal device through the secure channel, where the service key and the identifier of the service key are used to trigger the terminal device to store the service key and the identifier of the service key in the secure element (e.g., SE) of the terminal device through a TEE; receiving a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and determining the target service key based on the key identifier of the target service key, obtaining the service session key based on the target service key and the service session key ciphertext, and obtaining the service data of the target service based on the service session key and the service ciphertext information so as to perform service processing on the target service based on the service data of the target service. First, the security of the service key and the identifier of the service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 2

Figure 3:
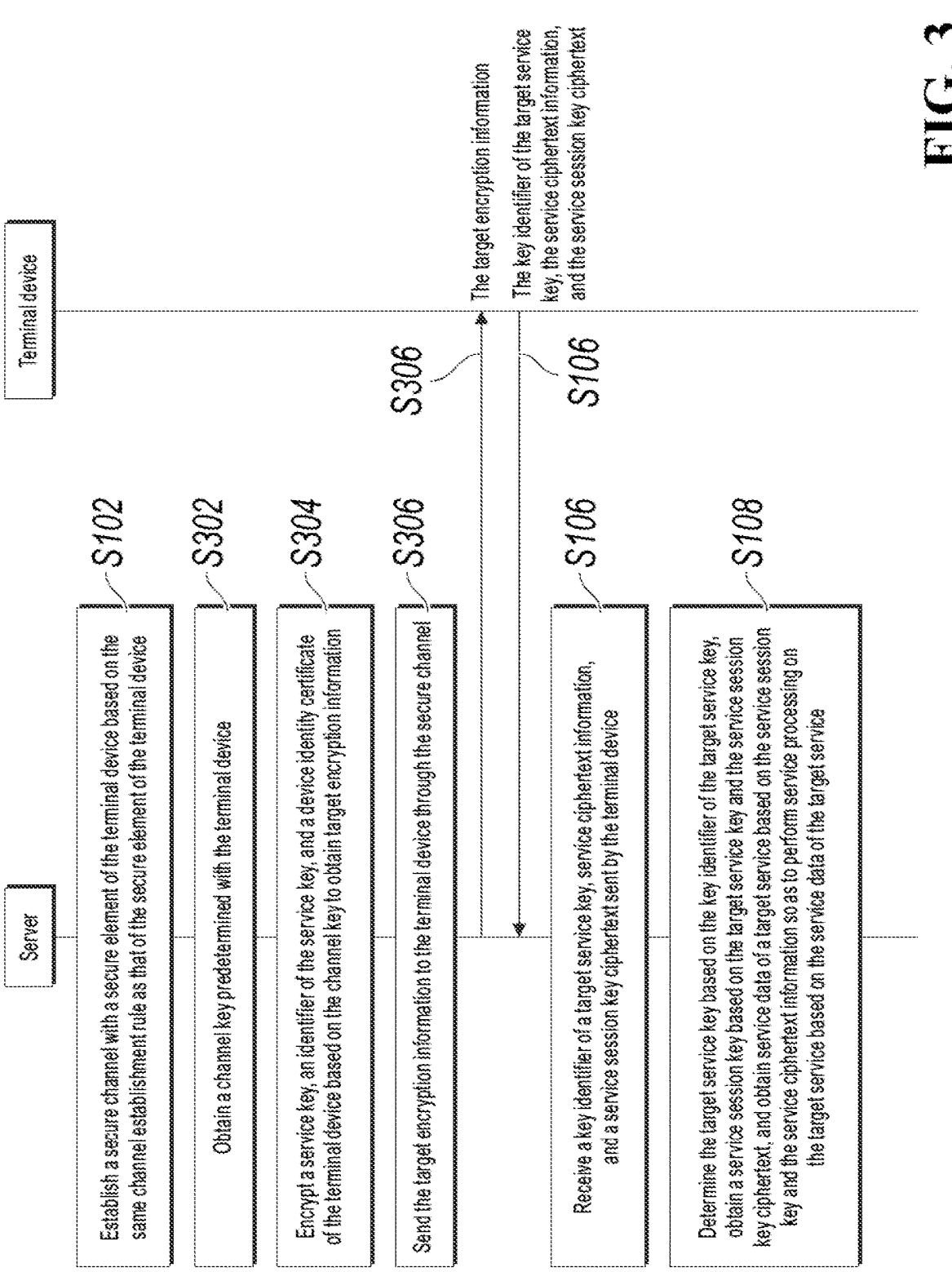
FIG. 3 is a schematic diagram illustrating a processing procedure of another data processing method, according to this specification.

As shown in FIG. 3, some embodiments of this specification provide data processing methods. The method can be performed by a server, and the server can be a standalone server, or a server cluster that includes a plurality of servers. The method can specifically include the following steps:

S102: Establish a secure channel with a secure element of a terminal device based on the same channel establishment rule as that of the secure element of the terminal device.

S302: Obtain a channel key predetermined with the terminal device.

In some implementations, the server can initiate a secure channel establishment request to the secure element (e.g., SE) of the terminal device, and in response to the secure channel establishment request, the SE can generate a session key by using an initial key, generate an SE authentication code based on the session key, and then encrypt the SE authentication code based on the session key and send the encrypted SE authentication code to the server. The server can generate a session key based on the same initial key as that of the SE, generate an SE authentication code based on the session key, and perform authentication on the SE based on the generated SE authentication code, the generated session key, and the encrypted SE authentication code sent by the SE. Similarly, the server can alternatively generate a host authentication code corresponding to the server based on the initial key or the like, and send the host authentication code to the SE. The SE can also generate a host authentication code corresponding to the server based on the initial key or the like, and perform authentication on the server based on the received host authentication code and the generated host authentication code. As such, establishment of the secure channel between the SE and the server is completed. Since mutual authentication between the server and the SE of the terminal device has been completed, the server and the SE can update the initial channel key (such as the initial channel key derived by the server and the SE based on the same key generation algorithm) through the secure channel to obtain the channel key for encrypting the data transmitted between the server and the SE, that is, the SE and the server can ensure secure sending of the data by using the secure channel key.

In addition, the channel key between the SE and the server can be a dynamic key, that is, a new channel key can be determined by using the above-mentioned method before each data transmission between the SE and the server. As such, the SE and the server negotiate a new channel key before each data transmission, and perform data transmission based on the negotiated new channel key, thereby further improving the security of the data transmission.

S304: Encrypt the service key, the identifier of the service key, and a device identity certificate of the terminal device based on the channel key to obtain target encryption information.

The device identity certificate of the terminal device can be a certificate for determining a trusted identity of the terminal device generated by the server based on the device identity key that is sent by the terminal device through the secure channel.

S306: Send the target encryption information to the terminal device through the secure channel.

The target encryption information can be used to trigger the terminal device to decrypt the target encryption information in the secure element to obtain the service key, the identifier of the service key, and the device identity certificate of the terminal device, and to store the service key, the identifier of the service key, and the device identity certificate of the terminal device that are obtained through decryption in the secure element. In other words, as shown in FIG. 2, secure storage of the data can be implemented in the SE.

S106: Receive a key identifier of a target service key, service ciphertext information, and a service session key ciphertext sent by the terminal device.

The service ciphertext information is obtained by the terminal device by encrypting service data of a target service in the secure element based on a randomly generated service session key, the service session key ciphertext is obtained by the terminal device by encrypting the service session key in the secure element based on the target service key, and the service session key is a key for encrypting the service data of the target service randomly generated by the terminal device in the TEE, that is, "one-time pad" is implemented. In other words, as shown in FIG. 2, secure encryption of the data can be implemented in the SE. As such, the SE sends only the key identifier of the target service key, the service ciphertext information, and the service session key ciphertext to the server so that it can be ensured that the target service key does not leave the SE, and the SE can provide chip-level isolation protection, thereby ensuring the storage and running security of the service key.

S108: Determine the target service key based on the key identifier of the target service key, and obtain the service session key based on the target service key and the service session key ciphertext.

In practice, the service ciphertext information can be obtained by the terminal device by encrypting the service data of the target service and the device identity certificate of the terminal device in the secure element based on the service session key. Correspondingly, the processing method in S108 can further include the following step 1 and step 2.

Step 1: Obtain the service data of the target service and the device identity certificate of the terminal device based on the service session key and the service ciphertext information.

In some implementations, the server can decrypt the service ciphertext information by using the service session key to obtain the service data of the target service and the device identity certificate of the terminal device.

Step 2: Perform device identity authentication on the terminal device based on the device identity certificate of the terminal device, and process the target service based on a device identity authentication result and the service data of the target service.

In some implementations, the server can perform device identity authentication on the terminal device based on the stored device identity certificate of the terminal device and the device identity certificate obtained through decryption, and process the target service based on the service data of the target service if the device identity authentication result indicates that the authentication succeeds. In addition, if the device identity authentication result indicates that the authentication fails, predetermined alarm information can be returned to the terminal device.

In addition, to ensure security in the data transmission process, the server can further receive first signature information sent by the terminal device and a user identifier of a target user, where the first signature information can be obtained by the terminal device by signing the service data of the target service, the device identity certificate of the terminal device, and the key identifier of the target service key in the secure element based on a service identity key, and the service identity key can be generated by the terminal device in the secure element based on the user identifier of the target user and a pre-stored device identity key. The target user can be any user, and the target user can be a user who initiates the target service. The user identifier of the target user can be a name, an account number, or the like of the target user, or can be information that can uniquely determine the identity of the target user and that can be calculated based on one or more types of above-mentioned information. The SE can derive a service identity key for signing the service data by using the user identifier of the target user and the pre-stored device identity key.

The server can generate the service identity key based on the user identifier of the target user and the device identity key of the terminal device, and generate second signature information based on the service identity key, the service data of the target service, the device identity certificate of the terminal device, and the key identifier of the target service key.

The server can perform signature authentication on the terminal device based on the first signature information and the second signature information, and process the target service based on a signature authentication result, the device identity authentication result, and the service data of the target service.

The server can process the target service based on the service data of the target service when the signature authentication succeeds and the identity authentication succeeds. As such, dual authentication of the device authentication and the signature authentication can be implemented to ensure the security of the service data of the target service in the data transmission process, thereby improving the security of the processing procedure of the target service.

Some embodiments of this specification provide data processing methods. The method includes: establishing a secure channel with a secure element of a terminal device based on the same channel establishment rule as that of the secure element of the terminal device; sending a service key and an identifier of the service key to the terminal device through the secure channel, where the service key and the identifier of the service key are used to trigger the terminal device to store the service key and the identifier of the service key in the secure element of the terminal device through a TEE; receiving a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and determining the target service key based on the key identifier of the target service key, obtaining the service session key based on the target service key and the service session key ciphertext, and obtaining the service data of the target service based on the service session key and the service ciphertext information so as to perform service processing on the target service based on the service data of the target service. First, the security of the service key and the identifier of the service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 3

Figure 4B:
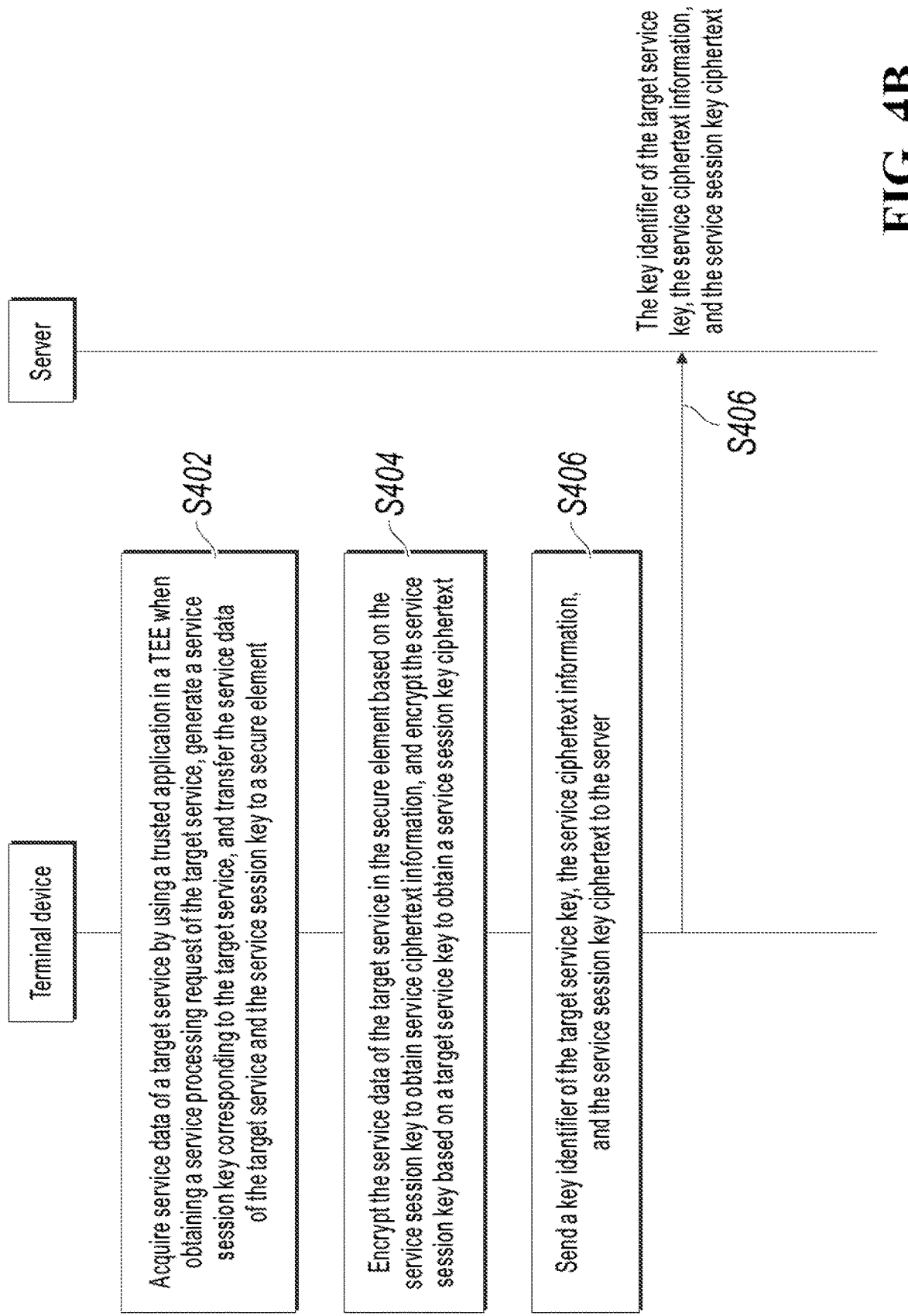
FIG. 4B is a schematic diagram illustrating a processing procedure of another data processing method, according to this specification.

As shown in FIG. 4A and FIG. 4B, some embodiments of this specification provide data processing methods. The method can be performed by a terminal device, and the terminal device can be a mobile terminal device such as a mobile phone or a tablet computer. The terminal device can include a trusted execution environment (TEE) and an encryption hardware-based secure element. The method can specifically include the following steps:

S402: Acquire service data of the target service by using a trusted application in the TEE when obtaining a service processing request of the target service, generate a service session key corresponding to the target service, and transfer the service data of the target service and the service session key to the secure element.

The service request can be sent by a service party when receiving a service processing request of a target user for a target service, and the service party can be an application program such as an application program running in a REE, in a terminal device that the TEE belongs to, capable of providing a service to the user, or can be a party that provides a service to the user and that processes the service requested by the user, for example, a resource transfer organization.

In some implementations, the terminal device can include a TEE, an encryption hardware-based secure element, and a REE to support storage of data of different security levels and execution of data processing procedure steps of different security levels.

Considering different security levels of different information, for example, the security level of basic service data of a target service, such as a service processing time or other basic data, can be medium, and can be stored in a storage area corresponding to a service party of the target service running in the REE. For the core service data related to the privacy information of the target user in the target service, the security level of the service data is high. To ensure that the privacy information of the target user is not easily tampered with, the core service data of the target service can be stored in a TEE with a high security level.

When obtaining the service processing request of the target service, the terminal device can acquire the service data of the target service (for example, the basic service data of the target service can be acquired from the REE and the core service data of the target service can be acquired from the TEE) by using the trusted application in the TEE, and randomly generate a service session key corresponding to the target service. Then, the terminal device can transfer the service data of the target service and the service session key to the secure element by using the trusted application in the TEE.

S404: Encrypt the service data of the target service in the secure element based on the service session key to obtain the service ciphertext information, and encrypt the service session key based on the target service key to obtain the service session key ciphertext.

The target service key and a key identifier of the target service key can be received by the terminal device from a server through a secure channel and transferred to the secure element through the TEE, and the secure channel can be a channel established between the secure channel of the terminal device and the server based on the same channel establishment rule as that of the server.

S406: Send a key identifier of a target service key, service ciphertext information, and a service session key ciphertext to the server.

The key identifier of the target service key can be used to trigger the server to determine the target service key, the target service key can be used to trigger the server to decrypt the service session key ciphertext to obtain the service session key, and the service session key can be used to trigger the server to decrypt the service ciphertext information to obtain the service data of the target service so as to perform service processing on the target service based on the service data of the target service.

Some embodiments of this specification provide data processing methods. The method includes: acquiring service data of the target service by using a trusted application in the TEE when obtaining a service processing request of the target service, generating a service session key corresponding to the target service, and transferring the service data of the target service and the service session key to the secure element; encrypting the service data of the target service in the secure element based on the service session key to obtain service ciphertext information, and encrypting the service session key based on a target service key to obtain a service session key ciphertext, where the target service key and a key identifier of the target service key are received by the terminal device from a server through a secure channel and transferred to the secure element through the TEE, and the secure channel is a channel established between the secure element of the terminal device and the server based on the same channel establishment rule as that of the server; and sending the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service. First, the security of the target service key and the key identifier of the target service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 4

Figure 5:
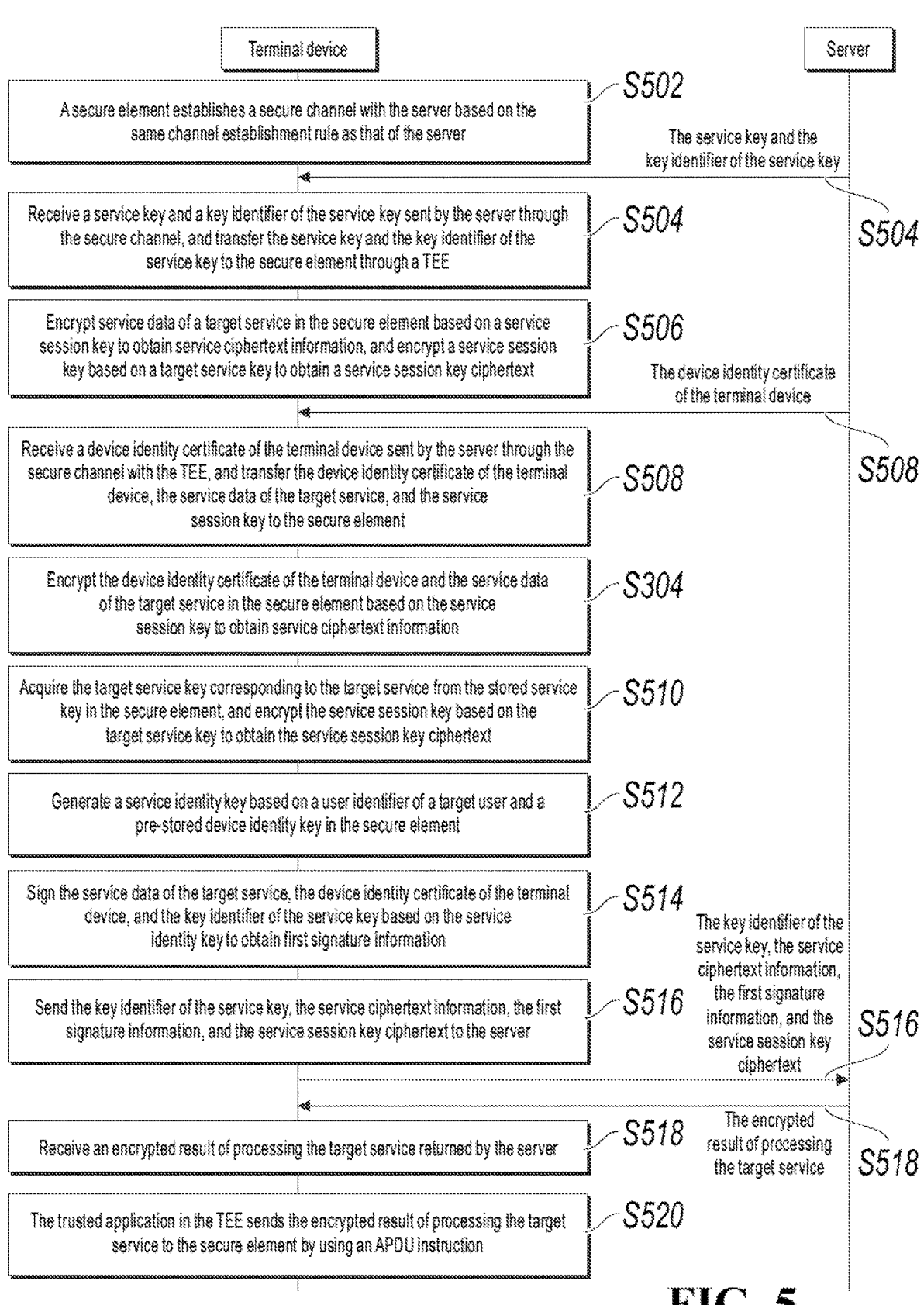
FIG. 5 is a schematic diagram illustrating a processing procedure of another data processing method, according to this specification.

As shown in FIG. 5, some embodiments of this specification provide data processing methods. The method can be performed by a terminal device, and the terminal device can be a mobile terminal device such as a mobile phone or a tablet computer. The terminal device can include a trusted execution environment (TEE) and an encryption hardware-based secure element. The method can specifically include the following steps:

S502: The secure element establishes the secure channel with the server based on the same channel establishment rule as that of the server.

In some implementations, for the process of establishing the secure channel, references can be made to the process of establishing the secure channel in S102 in Embodiment 1, and details are omitted for simplicity.

S504: Receive a service key and a key identifier of the service key sent by the server through the secure channel, and transfer the service key and the key identifier of the service key to the secure element through the TEE.

S506: Encrypt the service session key in the secure element based on the target service key to obtain a service session key ciphertext.

In some implementations, the TA can implement interaction with a key management applet in the SE by using an APDU instruction. For example, the TA can invoke the APDU instruction through a key management interface to encrypt the service session key in the SE based on the target service key to obtain the service session key ciphertext.

S508: Receive a device identity certificate of the terminal device sent by the server through the secure channel with the TEE, and transfer the device identity certificate of the terminal device, the service data of the target service, and the service session key to the secure element.

The device identity certificate is used to prove that the terminal device is authentic and credible.

S404: Encrypt the device identity certificate of the terminal device and the service data of the target service in the secure element based on the service session key to obtain the service ciphertext information.

In some implementations, the TA can also invoke the APDU instruction through the key management interface to read the device identity certificate of the terminal device and the service data of the target service from the SE, and encrypt the device identity certificate of the terminal device and the service data of the target service based on the service session key to obtain the service ciphertext information.

S510: Acquire the target service key corresponding to the target service from the stored service key in the secure element, and encrypt the service session key based on the target service key to obtain the service session key ciphertext.

In some implementations, since the terminal device can process a plurality of services, the secure element can store a plurality of different service keys, and the terminal device can acquire the target service key corresponding to the target service from the stored service key in the secure element, and encrypt the service session key based on the target service key to obtain the service session key ciphertext.

S512: Generate a service identity key based on a user identifier of a target user and a pre-stored device identity key in the secure element.

The service identity key can be a key (such as a symmetric key) or a pair of keys (such as asymmetric keys).

In some implementations, the service identity key of the target service can be derived by using the key derivation function of the secure element based on the user identifier of the target user and the pre-stored device identity key.

S514: Sign the service data of the target service, the device identity certificate of the terminal device, and the key identifier of the service key based on the service identity key to obtain first signature information.

In some implementations, if the service identity key is a pair of keys, signing can be performed based on the public key or the private key in the service identity key to obtain the first signature information.

S516: Send the key identifier of the service key, the service ciphertext information, the first signature information, and the service session key ciphertext to the server.

The first signature information can be used to trigger the server to perform signature authentication on the terminal device.

S518: Receive an encrypted result of processing the target service returned by the server.

S520: The trusted application in the TEE sends the encrypted result of processing the target service to the secure element by using the APDU instruction.

The encrypted result of processing the target service can be used to trigger the terminal device to decrypt the encrypted result of processing the target service in the secure element to obtain the result of processing the target service, and update the service data of the target service based on the result of processing the target service.

In some implementations, if the terminal device is in an offline scenario, the terminal device can send the key identifier of the service key, the service ciphertext information, the first signature information, and the service session key ciphertext to the server when the terminal device is in a network connection state, and receive the encrypted result of processing the target service returned by the server.

The terminal device can decrypt the target service in the secure element, and update the service data of the target service. For example, if the target service is a resource transfer service, in an offline scenario, the secure element of the terminal device can store an original resource quantity of the target service. When receiving the service processing request of the target service, the terminal device can generate a remaining resource quantity of the processed target service based on a resource quantity to be transferred and the original resource quantity included in the service processing request. The terminal device can process the remaining resource quantity and the resource quantity to be transferred as the service data of the target service to obtain the service ciphertext information and the first signature information.

When the terminal device is in a network connection state, the terminal device can send the key identifier of the service key, the service ciphertext information, the first signature information, and the service session key ciphertext to the server to trigger the server to perform verifying processing on the resource data to be transferred and the remaining resource data to obtain a result of processing the target service, and return the processing result to the terminal device.

The terminal device can update the service data of the target service based on the result of processing the target service. For example, if the result of processing the target service indicates that the verifying succeeds, the server can update the original resource quantity to the remaining resource quantity.

In most risk control solutions, risk control processing is performed based on the online data. Therefore, the risk control detection efficiency and the risk detection accuracy in the offline scenario are poor. However, in the above-mentioned processing procedure of this specification, the secure element can be used to implement the security of the data at the hardware level and the security of the data transmission process, that is, to improve the service processing security in the offline scenario.

Some embodiments of this specification provide data processing methods. The method includes: acquiring service data of the target service by using a trusted application in the TEE when obtaining a service processing request of the target service, generating a service session key corresponding to the target service, and transferring the service data of the target service and the service session key to the secure element; encrypting the service data of the target service in the secure element based on the service session key to obtain service ciphertext information, and encrypting the service session key based on a target service key to obtain a service session key ciphertext, where the target service key and a key identifier of the target service key are received by the terminal device from a server through a secure channel and transferred to the secure element through the TEE, and the secure channel is a channel established between the secure element of the terminal device and the server based on the same channel establishment rule as that of the server; and sending the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service. First, the security of the target service key and the key identifier of the target service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 5

Figure 6:
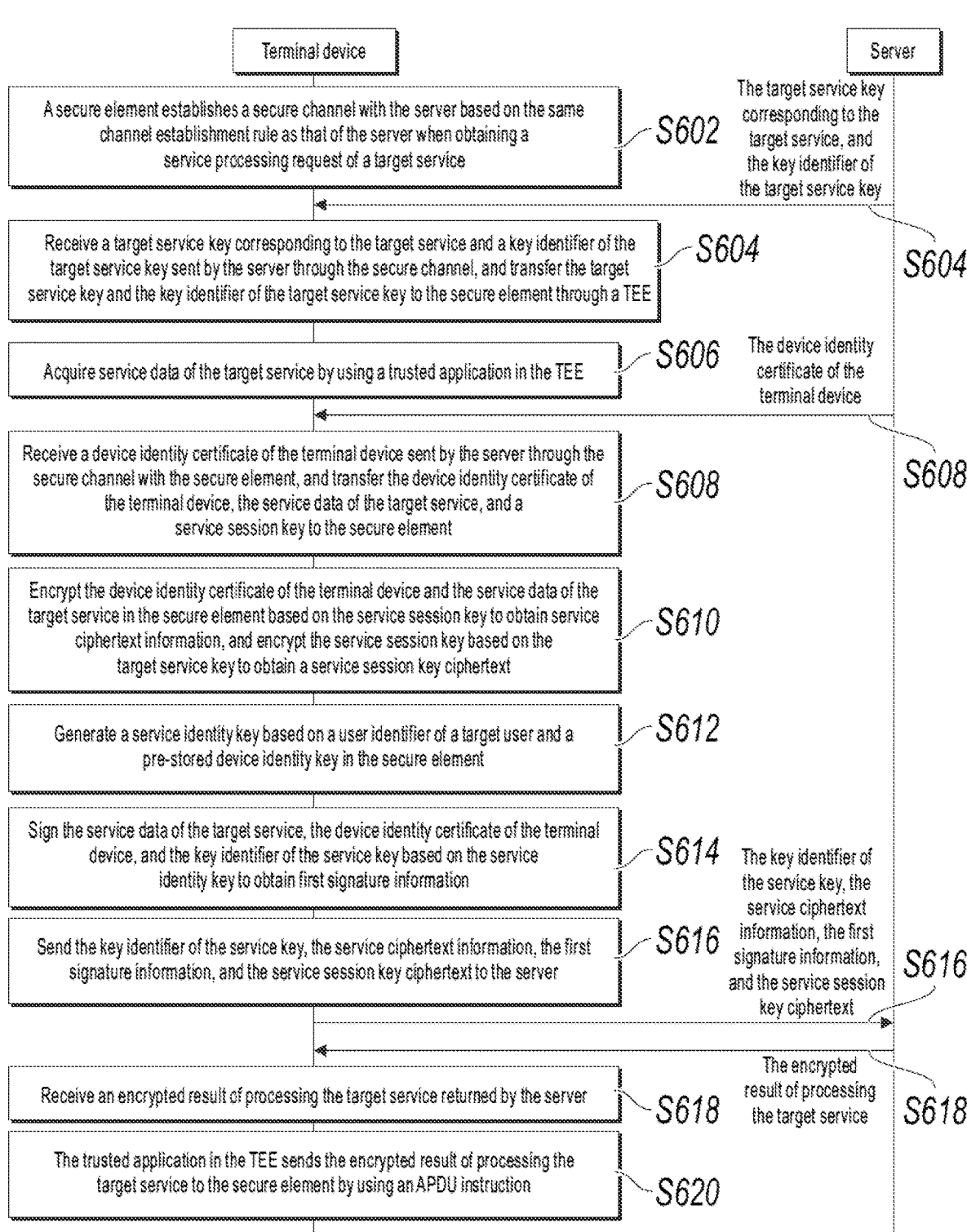
FIG. 6 is a schematic diagram illustrating a processing procedure of another data processing method, according to this specification.

As shown in FIG. 6, some embodiments of this specification provide data processing methods. The method can be performed by a terminal device, and the terminal device can be a mobile terminal device such as a mobile phone or a tablet computer. The terminal device can include a trusted execution environment (TEE) and an encryption hardware-based secure element. The method can specifically include the following steps:

S602: The secure element establishes the secure channel with the server based on the same channel establishment rule as that of the server when obtaining the service processing request of the target service.

S604: Receive the target service key corresponding to the target service and the key identifier of the target service key sent by the server through the secure channel, and transfer the target service key and the key identifier of the target service key to the secure element through the TEE.

In some implementations, the terminal device can send the service identifier of the target service to the server through the secure channel so that the server determines the target service key corresponding to the target service and the key identifier of the target service key based on the service identifier of the target service.

S606: Acquire the service data of the target service by using the trusted application in the TEE.

S608: Receive a device identity certificate of the terminal device sent by the server through the secure channel with the secure element, and transfer the device identity certificate of the terminal device, the service data of the target service, and the service session key to the secure element.

S610: Encrypt the device identity certificate of the terminal device and the service data of the target service in the secure element based on the service session key to obtain the service ciphertext information, and encrypt the service session key based on the target service key to obtain the service session key ciphertext.

S612: Generate a service identity key based on a user identifier of a target user and a pre-stored device identity key in the secure element.

S614: Sign the service data of the target service, the device identity certificate of the terminal device, and the key identifier of the service key based on the service identity key to obtain first signature information.

S616: Send the key identifier of the service key, the service ciphertext information, the first signature information, and the service session key ciphertext to the server.

The first signature information can be used to trigger the server to perform signature authentication on the terminal device.

S618: Receive an encrypted result of processing the target service returned by the server.

S620: The trusted application in the TEE sends the encrypted result of processing the target service to the secure element by using the APDU instruction.

The encrypted result of processing the target service can be used to trigger the terminal device to decrypt the encrypted result of processing the target service in the secure element to obtain the result of processing the target service, and update the service data of the target service based on the result of processing the target service.

For the processing procedure of the above-mentioned S612 to S620, references can be made to the processing procedure of S512 to S520 in Embodiment 4, and details are omitted for simplicity.

Some embodiments of this specification provide data processing methods. The method includes: acquiring service data of the target service by using a trusted application in the TEE when obtaining a service processing request of the target service, generating a service session key corresponding to the target service, and transferring the service data of the target service and the service session key to the secure element; encrypting the service data of the target service in the secure element based on the service session key to obtain service ciphertext information, and encrypting the service session key based on a target service key to obtain a service session key ciphertext, where the target service key and a key identifier of the target service key are received by the terminal device from a server through a secure channel and transferred to the secure element through the TEE, and the secure channel is a channel established between the secure element of the terminal device and the server based on same channel establishment rule as that of the secure element of the server; and sending the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service. First, the security of the target service key and the key identifier of the target service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving security in the service processing process.

Embodiment 6

Some embodiments of this specification provide data processing systems. The data processing system can include a terminal device and a server. The terminal device can be a mobile terminal device such as a mobile phone or a tablet computer. The terminal device can include a trusted execution environment (TEE) and an encryption hardware-based secure element. The server can be a standalone server, or a server cluster that includes a plurality of servers.

The terminal device is configured to acquire service data of the target service by using a trusted application in the TEE when obtaining a service processing request of the target service, generate a service session key corresponding to the target service, and transfer the service data of the target service and the service session key to the secure element.

The server is configured to establish a secure channel with the secure element of the terminal device based on the same channel establishment rule as that of the secure element of the terminal device, and transfer a service key and an identifier of the service key to the terminal device through the secure channel.

The terminal device is configured to encrypt the service data of the target service in the secure element based on the service session key to obtain the service ciphertext information, and encrypt the service session key based on the target service key to obtain the service session key ciphertext.

The terminal device can perform device authentication with the server when obtaining the service processing request of the target service, establish a secure channel with the server that completes the device authentication based on the same channel establishment rule as that of the server, receive the target service key corresponding to the target service and the key identifier of the target service key sent by the server through the secure channel, and transfer the target service key and the key identifier of the target service key to the secure element through the TEE.

Alternatively, before the terminal device obtains the service processing request of the target service, the secure element of the terminal device can establish a secure channel with the server based on the same channel establishment rule as that of the server, receive the service key and the key identifier of the service key sent by the server through the secure channel, transfer the service key and the key identifier of the service key to the secure element through the TEE, and then acquire the target service key corresponding to the target service from the stored service key and the key identifier of the target service key in the secure element.

Alternatively, before the terminal device obtains the service processing request of the target service, the secure element can establish a secure channel with the server based on the same channel establishment rule as that of the server, and send the service identifier of the target service to the server through the secure channel. The server can determine the target service key and the key identifier of the target service key based on the service identifier of the target service, and send the target service key and the key identifier of the target service key to the terminal device through the secure channel. The terminal device transfers the target service key and the key identifier of the target service key to the secure element through the TEE.

The terminal device is further configured to send the key identifier of the target service key, the service ciphertext information, and the service session key ciphertext to the server.

The server is configured to determine the target service key based on the key identifier of the target service key, obtain the service session key based on the target service key and the service session key ciphertext, and obtain the service data of the target service based on the service session key and the service ciphertext information so as to perform service processing on the target service based on the service data of the target service.

Some embodiments of this specification provide data processing methods. First, the security of the service key and the identifier of the service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service cipher-text information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 7

Figure 7:
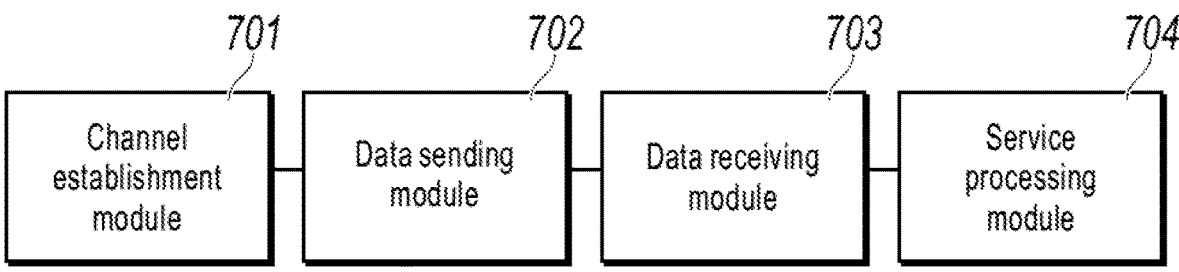
FIG. 7 is a schematic structural diagram illustrating a data processing apparatus, according to some embodiments of this specification.

The data processing method provided in some embodiments of this specification has been described previously. Based on the same idea, some embodiments of this specification further provide a data processing apparatus, as shown in FIG. 7.

The data processing apparatus includes a channel establishment module 701, a data sending module 702, a data receiving module 703, and a service processing module 704.

The channel establishment module 701 is configured to establish a secure channel with a secure element of a terminal device based on the same channel establishment rule as that of the secure element of the terminal device.

The data sending module 702 is configured to send a service key and an identifier of the service key to the terminal device through the secure channel, where the service key and the identifier of the service key are used to trigger the terminal device to store the service key and the identifier of the service key in the secure element of the terminal device through a TEE.

The data receiving module 703 is configured to receive a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE.

The service processing module 704 is configured to determine the target service key based on the key identifier of the target service key, obtain the service session key based on the target service key and the service session key cipher-text, and obtain the service data of the target service based on the service session key and the service ciphertext infor-mation so as to perform service processing on the target service based on the service data of the target service.

In some embodiments of this specification, the data send-ing module 702 is configured to: obtain a channel key determined through pre-negotiation with the terminal device; encrypt the service key, the identifier of the service key, and a device identity certificate of the terminal device based on the channel key to obtain target encryption infor-mation; send the target encryption information to the termi-nal device through the secure channel, where the target encryption information is used to trigger the terminal device to decrypt the target encryption information in the secure element to obtain the service key, the identifier of the service key, and the device identity certificate of the terminal device; the service ciphertext information is obtained by the termi-nal device by encrypting the service data of the target service and the device identity certificate of the terminal device in the secure element based on the service session key; and the service processing module 704 is configured to: obtain the service data of the target service and the device identity certificate of the terminal device based on the service session key and the service ciphertext information; and perform device identity authentication on the terminal device based on the device identity certificate of the terminal device, and process the target service based on a device identity authen-tication result and the service data of the target service.

In some embodiments of this specification, the service processing module 704 is configured to: receive first signa-ture information sent by the terminal device and a user identifier of a target user, where the first signature informa-tion is obtained by the terminal device by signing the service data of the target service, the device identity certificate of the terminal device, and the key identifier of the target service key in the secure element based on a service identity key, and the service identity key is generated by the terminal device in the secure element based on the user identifier of the target user and a pre-stored device identity key; generate the service identity key based on the user identifier of the target user and the device identity key of the terminal device, and generate second signature information based on the service identity key, the service data of the target service, the device identity certificate of the terminal device, and the key identifier of the target service key; and perform signature authentication on the terminal device based on the first signature information and the second signature information, and process the target service based on a signature authen-tication result, the device identity authentication result, and the service data of the target service.

Some embodiments of this specification provide data processing apparatuses. First, the security of the service key and the identifier of the service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 8

The data processing method provided in some embodi-ments of this specification has been described previously.

Figure 8:
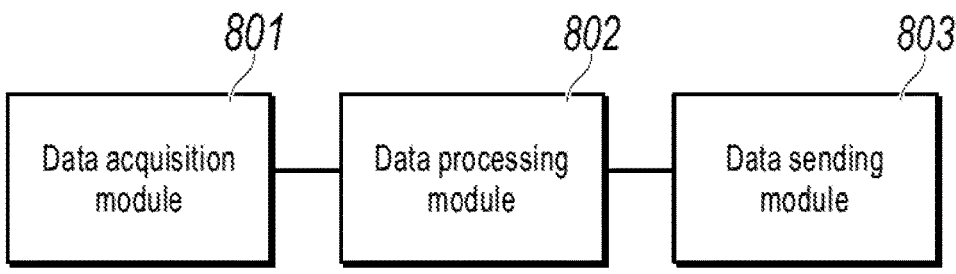
FIG. 8 is a schematic structural diagram illustrating another data processing apparatus, according to some embodiments of this specification.

Based on the same idea, some embodiments of this specification further provide a data processing apparatus. The data processing apparatus includes a trusted execution environment (TEE) and an encryption hardware-based secure element, as shown in FIG. 8.

The data processing apparatus includes a data acquisition module 801, a data processing module 802, and a data sending module 803.

The data acquisition module 801 is configured to acquire service data of the target service by using a trusted application in the TEE when obtaining a service processing request of the target service, generate a service session key corresponding to the target service, and transfer the service data of the target service and the service session key to the secure element.

The data processing module 802 is configured to encrypt the service data of the target service in the secure element based on the service session key to obtain service ciphertext information, and encrypt the service session key based on a target service key to obtain a service session key ciphertext, where the target service key and a key identifier of the target service key are received by the data processing apparatus from a server through a secure channel and transferred to the secure element through the TEE, and the secure channel is a channel established between the secure element of the data processing apparatus and the server based on the same channel establishment rule as that of the server.

The data sending module 803 is configured to send the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service.

In some embodiments of this specification, the apparatus further includes: a channel establishment module, configured to establish, by the secure element, the secure channel with the server based on the same channel establishment rule as that of the server; and a first sending module, configured to receive a service key and a key identifier of the service key sent by the server through the secure channel, and transfer the service key and the key identifier of the service key to the secure element through the TEE; and the data processing module 802 is configured to: acquire the target service key corresponding to the target service from the stored service key, and encrypt the service session key based on the target service key to obtain the service session key ciphertext.

In some embodiments of this specification, the data acquisition module 801 is configured to: establish, by the secure element, the secure channel with the server based on the same channel establishment rule as that of the server when obtaining the service processing request of the target service; receive the target service key corresponding to the target service and the key identifier of the target service key sent by the server through the secure channel, and transfer the target service key and the key identifier of the target service key to the secure element through the TEE; and acquire the service data of the target service by using the trusted application in the TEE.

In some embodiments of this specification, the data acquisition module 801 is configured to: receive a device identity certificate of the data processing apparatus sent by the server through the secure channel with the secure element, and transfer the device identity certificate of the data processing apparatus, the service data of the target service, and the service session key to the secure element; and the encrypting the service data of the target service based on the service session key to obtain service ciphertext information includes: encrypting the device identity certificate of the data processing apparatus and the service data of the target service based on the service session key to obtain the service ciphertext information.

In some embodiments of this specification, the apparatus further includes: a key generation module, configured to generate a service identity key based on a user identifier of a target user and a pre-stored device identity key in the secure element; and a signature processing module, configured to sign the service data of the target service, the device identity certificate of the data processing apparatus, and the key identifier of the service key based on the service identity key to obtain first signature information; and the data sending module 803 is configured to: send the key identifier of the service key, the service ciphertext information, the first signature information, and the service session key ciphertext to the server, where the first signature information is used to trigger the server to perform signature authentication on the data processing apparatus.

In some embodiments of this specification, the apparatus further includes: a result receiving module, configured to receive an encrypted result of processing the target service returned by the server; and a service processing module, configured to send, by the trusted application in the TEE, the encrypted result of processing the target service to the secure element by using an APDU instruction, where the encrypted result of processing the target service is used to trigger the data processing apparatus to decrypt the encrypted result of processing the target service in the secure element to obtain the result of processing the target service, and update the service data of the target service based on the result of processing the target service.

Some embodiments of this specification provide data processing apparatuses. First, the security of the target service key and the key identifier of the target service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 9

Figure 9:
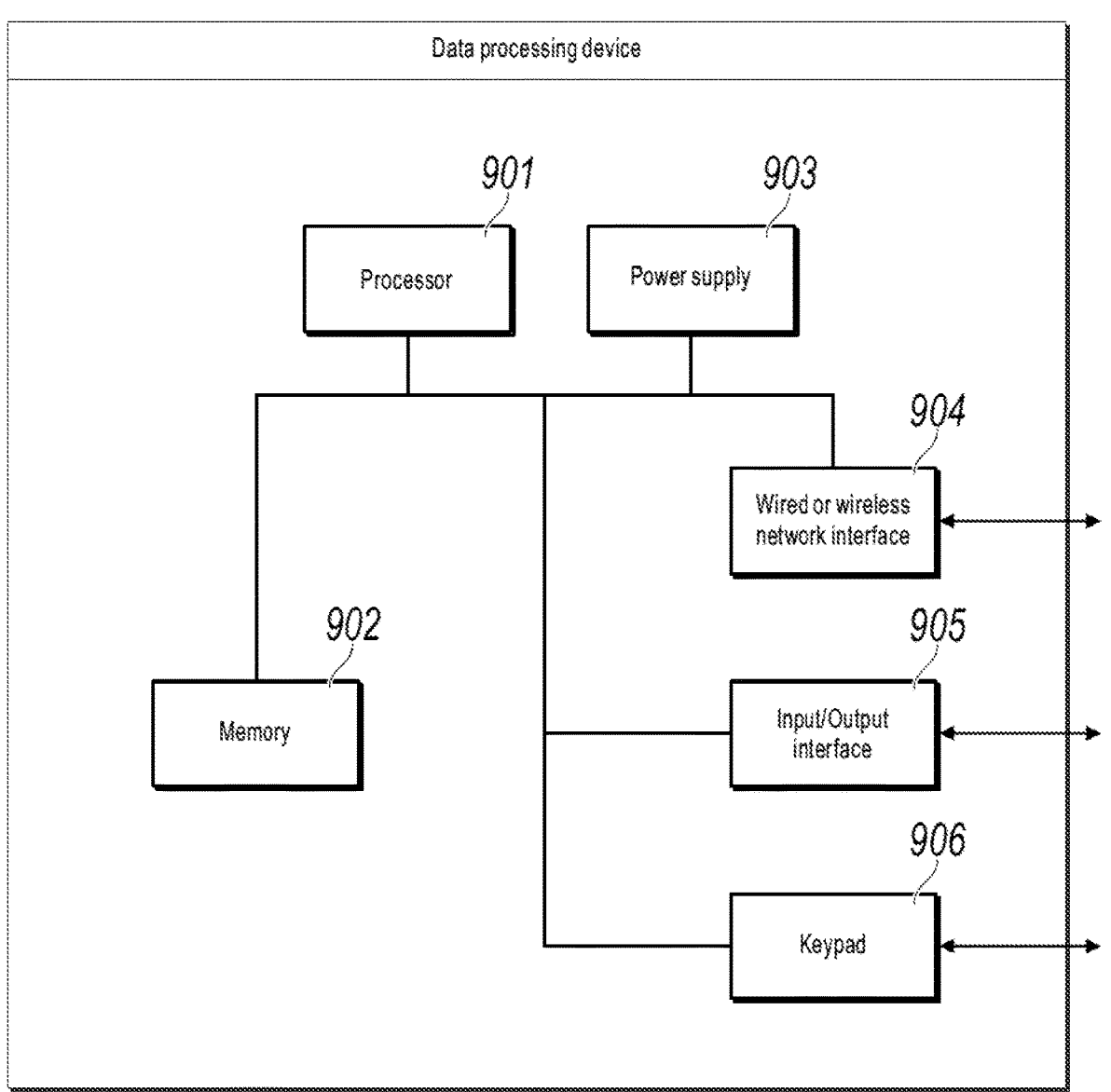
FIG. 9 is a schematic structural diagram illustrating a data processing device, according to this specification.

Based on the same idea, some embodiments of this specification further provide a data processing device, as shown in FIG. 9.

The data processing device can differ greatly because of a difference in configuration or performance, and can include one or more processors 901 and one or more memories 902. The memory 902 can store one or more application programs or data. The memory 902 can be a temporary storage or a persistent storage. The application program stored in the memory 902 can include one or more modules (not shown in the figure), and each module can include a series of computer-executable instructions in the data processing device. Still further, the processor 901 can be configured to communicate with the memory 902 to execute a series of computer-executable instructions in the memory 902 on the data processing device. The data processing device can further include one or more power supplies 903, one or more wired or wireless network interfaces 904, one or more input/output interfaces 905, one or more keypads 906, etc.

In some specific embodiments, the data processing device includes a memory and one or more programs, where the one or more programs are stored in the memory, and the one or more programs can include one or more modules, and each module can include a series of computer-executable instructions in the data processing device. One or more processors are configured to execute the computer-executable instructions included in the one or more programs to perform the following operations: establishing a secure channel with a secure element of a terminal device based on the same channel establishment rule as that of the secure element of the terminal device; sending a service key and an identifier of the service key to the terminal device through the secure channel, where the service key and the identifier of the service key are used to trigger the terminal device to store the service key and the identifier of the service key in the secure element of the terminal device through a TEE; receiving a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and determining the target service key based on the key identifier of the target service key, obtaining the service session key based on the target service key and the service session key ciphertext, and obtaining the service data of the target service based on the service session key and the service ciphertext information so as to perform service processing on the target service based on the service data of the target service.

Optionally, the sending a service key and an identifier of the service key to the terminal device through the secure channel includes: obtaining a channel key determined through pre-negotiation with the terminal device; encrypting the service key, the identifier of the service key, and a device identity certificate of the terminal device based on the channel key to obtain target encryption information; sending the target encryption information to the terminal device through the secure channel, where the target encryption information is used to trigger the terminal device to decrypt the target encryption information in the secure element to obtain the service key, the identifier of the service key, and the device identity certificate of the terminal device; the service ciphertext information is obtained by the terminal device by encrypting the service data of the target service and the device identity certificate of the terminal device in the secure element based on the service session key; and the obtaining the service data of the target service based on the service session key and the service ciphertext information so as to perform service processing on the target service based on the service data of the target service includes: obtaining the service data of the target service and the device identity certificate of the terminal device based on the service session key and the service ciphertext information; and performing device identity authentication on the terminal device based on the device identity certificate of the terminal device, and processing the target service based on a device identity authentication result and the service data of the target service.

Optionally, the processing the target service based on a device identity authentication result and the service data of the target service includes: receiving first signature information sent by the terminal device and a user identifier of a target user, where the first signature information is obtained by the terminal device by signing the service data of the target service, the device identity certificate of the terminal device, and the key identifier of the target service key in the secure element based on a service identity key, and the service identity key is generated by the terminal device in the secure element based on the user identifier of the target user and a pre-stored device identity key; generating the service identity key based on the user identifier of the target user and the device identity key of the terminal device, and generating second signature information based on the service identity key, the service data of the target service, the device identity certificate of the terminal device, and the key identifier of the target service key; and performing signature authentication on the terminal device based on the first signature information and the second signature information, and processing the target service based on a signature authentication result, the device identity authentication result, and the service data of the target service.

In addition, in some specific embodiments, the data processing device can further include a trusted execution environment (TEE) and an encryption hardware-based secure element, and the data processing device includes a memory and one or more programs, where the one or more programs are stored in the memory, and the one or more programs can include one or more modules, and each module can include a series of computer-executable instructions in the data processing device. One or more processors are configured to execute the computer-executable instructions included in the one or more programs to perform the following operations: acquiring service data of the target service by using a trusted application in the TEE when obtaining a service processing request of the target service, generating a service session key corresponding to the target service, and transferring the service data of the target service and the service session key to the secure element; encrypting the service data of the target service in the secure element based on the service session key to obtain service ciphertext information, and encrypting the service session key based on a target service key to obtain a service session key ciphertext, where the target service key and a key identifier of the target service key are received by the data processing device from a server through a secure channel and transferred to the secure element through the TEE, and the secure channel is a channel established between the secure element of the data processing device and the server based on the same channel establishment rule as that of the server; and sending the key identifier of the target service key, the service ciphertext information, and the service session key ciphertext to the server, where the key identifier of the target service key is used to trigger the server to determine the target service key, the target service key is used to trigger the server to decrypt the service session key ciphertext to obtain the service session key, and the service session key is used to trigger the server to decrypt the service ciphertext information to obtain the service data of the target service so as to perform service processing on the target service based on the service data of the target service.

Optionally, before the acquiring service data of the target service by using a trusted application in the TEE when obtaining a service processing request of the target service, the following operations are further included: establishing, by the secure element, the secure channel with the server that completes the device authentication based on the same channel establishment rule as that of the server; receiving a service key and a key identifier of the service key sent by the server through the secure channel, and transferring the service key and the key identifier of the service key to the secure element through the TEE; and the encrypting the service session key based on a target service key to obtain a service session key ciphertext includes: acquiring the target service key corresponding to the target service from the stored service key, and encrypting the service session key based on the target service key to obtain the service session key ciphertext.

Optionally, the acquiring service data of the target service by using a trusted application in the TEE when obtaining a service processing request of the target service includes: establishing, by the secure element, the secure channel with the server that completes the device authentication based on the same channel establishment rule as that of the server when obtaining the service processing request of the target service; receiving the target service key corresponding to the target service and the key identifier of the target service key sent by the server through the secure channel, and transferring the target service key and the key identifier of the target service key to the secure element through the TEE; and acquiring the service data of the target service by using the trusted application in the TEE.

Optionally, the transferring the service data of the target service and the service session key to the secure element includes: receiving a device identity certificate of the data processing device sent by the server through the secure channel with the secure element, and transferring the device identity certificate of the data processing device, the service data of the target service, and the service session key to the secure element; and the encrypting the service data of the target service based on the service session key to obtain service ciphertext information includes: encrypting the device identity certificate of the data processing device and the service data of the target service based on the service session key to obtain the service ciphertext information.

Optionally, before the sending the key identifier of the service key, the service ciphertext information, and the service session key ciphertext to the server, the following operations are further included: generating a service identity key based on a user identifier of a target user and a pre-stored device identity key in the secure element; signing the service data of the target service, the device identity certificate of the data processing device, and the key identifier of the service key based on the service identity key to obtain first signature information; and the sending the key identifier of the service key, the service ciphertext information, and the service session key ciphertext to the server includes: sending the key identifier of the service key, the service ciphertext information, the first signature information, and the service session key ciphertext to the server, where the first signature information is used to trigger the server to perform signature authentication on the data processing device.

Optionally, the method further includes: receiving an encrypted result of processing the target service returned by the server; and sending, by the trusted application in the TEE, the encrypted result of processing the target service to the secure element by using an application protocol data unit (APDU) instruction, where the encrypted result of processing the target service is used to trigger the terminal device to decrypt the encrypted result of processing the target service in the secure element to obtain the result of processing the target service, and update the service data of the target service based on the result of processing the target service.

Some embodiments of this specification provide data processing devices. First, the security of the service key and the identifier of the service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Embodiment 10

Some embodiments of this specification further provide a computer-readable storage medium. The computer-readable storage medium stores a computer program. The computer program is executed by a processor to implement various processes of the above-mentioned data processing method embodiments and achieve the same technical effects. To avoid repetition, details are omitted for simplicity. The computer-readable storage medium includes, for example, a read-only memory (ROM), a random access memory (RAM), a magnetic disk, or an optical disc.

Some embodiments of this specification provide a computer-readable storage medium. The following operations are included: establishing a secure channel with a secure element of a terminal device based on the same channel establishment rule as that of the secure element of the terminal device; sending a service key and an identifier of the service key to the terminal device through the secure channel, where the service key and the identifier of the service key are used to trigger the terminal device to store the service key and the identifier of the service key in the secure element of the terminal device through a TEE; receiving a key identifier of a target service key, service ciphertext information, and a service session key ciphertext sent by the terminal device, where the service ciphertext information is obtained by the terminal device by encrypting service data of a target service in the secure element based on a service session key, the service session key ciphertext is obtained by the terminal device by encrypting the service session key in the secure element based on the target service key, and the service session key is a key corresponding to the target service generated by the terminal device in the TEE; and determining the target service key based on the key identifier of the target service key, obtaining the service session key based on the target service key and the service session key ciphertext, and obtaining the service data of the target service based on the service session key and the service ciphertext information so as to perform service processing on the target service based on the service data of the target service. First, the security of the service key and the identifier of the service key in the transmission process can be ensured through the secure channel. Second, since the secure element can provide secure storage at the hardware level, it is determined by a physical means that the data do not flow out of the chip. Even if the terminal device is acquired by a malicious third party, security of the data in the secure element can still be ensured. Therefore, the security, confidentiality, and integrity of the data in the terminal device can be ensured using the secure element. In addition, the secure element can further provide a secure key running environment. Therefore, the security of the service ciphertext information and the service session key ciphertext generated in the secure element is high, and the security of the process in which the server processes the target service based on the service ciphertext information and the service session key ciphertext is high. In addition, the terminal device sends only the key identifier of the target service key to the server so that the security of the service key can be ensured while the key does not leave the domain, thereby improving the security in the service processing process.

Some specific embodiments of this specification are described previously. Other embodiments fall within the scope of the appended claims. In some cases, actions or steps described in the claims can be performed in a sequence different from that in some embodiments and desired results can still be achieved. In addition, processes described in the accompanying drawings do not necessarily require a specific order or a sequential order shown to achieve the desired results. In some implementations, multitasking and parallel processing are also possible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the above-mentioned some embodiments can be implemented by using a computer chip or an entity, or can be implemented by using a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, during implementation of one or more embodiments of this specification, the functions of each unit can be implemented in one or more pieces of software and/or hardware.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

Some embodiments of this specification are described with reference to at least one of flowcharts or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way so that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which implement information storage by using any method or technology. Information can be a computer-readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion so that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

One or more embodiments of this specification can be described in the general context of computer-executable instructions, for example, a program module. Generally, the program module includes a routine, a program, an object, a component, a data structure, etc. executing a specific task or implementing a specific abstract data type. One or more embodiments of this specification can alternatively be practiced in distributed computing environments in which tasks are performed by remote processing devices that are connected through a communications network. In a distributed computing environment, the program module can be located in both local and remote computer storage media including storage devices.

Some embodiments of this specification are described in a progressive way. For same or similar parts of some embodiments, mutual references can be made to some embodiments. Each embodiment focuses on a difference from other embodiments. Particularly, some system embodiments are briefly described since they are basically similar to some method embodiments. For related parts, references can be made to related descriptions in some method embodiments.

The previous descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A computer-implemented method for data processing, comprising:

acquiring service data of a target service by using a trusted application in a trusted execution environment (TEE) when obtaining a service processing request of the target service, generating a service session key corresponding to the target service, and transferring the service data of the target service and the service session key to a secure element, wherein the secure element is encryption hardware-based;

encrypting the service data of the target service in the secure element based on the service session key to obtain service ciphertext information, and encrypting the service session key based on a target service key to obtain a service session key ciphertext, wherein the target service key and a key identifier of the target service key are received by a terminal device from a server device through a secure channel and transferred to the secure element through the TEE, wherein the terminal device comprises the TEE and the secure element, and wherein the secure channel is a channel established between the secure element of the terminal device and the server device based on a same channel establishment rule as that of the server device;

generating a service identity key based on a user identifier of a target user and a pre-stored device identity key in the secure element, wherein the user identifier of the target user comprises a name of the target user or an account number of the target user;

obtaining first signature information based on the service data of the target service and the service identity key; and sending the key identifier of the target service key, the service ciphertext information, the first signature information, and the service session key ciphertext to the server device, wherein the key identifier of the target service key is used to trigger the server device to determine the target service key, the target service key is used to trigger the server device to decrypt the service session key ciphertext to obtain the service session key, and the service session key is used to trigger the server device to decrypt the service ciphertext information to obtain the service data of the target service so as to perform service processing on the target service based on the service data of the target service.

2. The computer-implemented method of claim 1, wherein, before acquiring service data of a target service by using a trusted application in a trusted execution environment (TEE) when obtaining a service processing request of the target service:

establishing, by the secure element, the secure channel with the server device based on the same channel establishment rule as that of the server device;

receiving a service key and a key identifier of the service key sent by the server device through the secure channel, and transferring the service key, as a stored service key, and the key identifier of the service key to the secure element through the TEE; and the encrypting the service session key based on a target service key to obtain a service session key ciphertext comprises:

acquiring the target service key corresponding to the target service from the stored service key, and encrypting the service session key based on the target service key to obtain the service session key ciphertext.

3. The computer-implemented method of claim 1, wherein acquiring service data of a target service by using a trusted application in a trusted execution environment (TEE) when obtaining a service processing request of the target service, comprises:

establishing, by the secure element, the secure channel with the server device based on the same channel establishment rule as that of the server device when obtaining the service processing request of the target service;

receiving the target service key corresponding to the target service and the key identifier of the target service key sent by the server device through the secure channel, and transferring the target service key and the key identifier of the target service key to the secure element through the TEE; and acquiring the service data of the target service by using the trusted application in the TEE.

4. The computer-implemented method of claim 2, wherein transferring the service data of the target service and the service session key to the secure element comprises:

receiving a device identity certificate of the terminal device sent by the server device through the secure channel with the secure element, and transferring the device identity certificate of the terminal device, the service data of the target service, and the service session key to the secure element; and the encrypting the service data of the target service based on the service session key to obtain service ciphertext information comprises:

encrypting the device identity certificate of the terminal device and the service data of the target service based on the service session key to obtain the service ciphertext information.

5. The computer-implemented method of claim 4, wherein, before sending the key identifier of the target service key, the service ciphertext information, and the service session key ciphertext to the server device:

the obtaining first signature information based on the service data of the target service and the service identity key comprises:

signing the service data of the target service, the device identity certificate of the terminal device, and the key identifier of the service key based on the service identity key to obtain the first signature information; and the sending the key identifier of the service key, the service ciphertext information, and the service session key ciphertext to the server device comprises:

sending the key identifier of the service key, the service ciphertext information, the first signature information, and the service session key ciphertext to the server device, wherein the first signature information is used to trigger the server device to perform signature authentication on the terminal device.

6. The computer-implemented method of claim 1, comprising:

receiving an encrypted result of processing the target service returned by the server device.

7. The computer-implemented method of claim 6, comprising:

sending, by the trusted application in the TEE, the encrypted result of processing the target service to the secure element by using an application protocol data unit (APDU) instruction, wherein the encrypted result of processing the target service is used to trigger the terminal device to decrypt the encrypted result of processing the target service in the secure element to obtain a result of processing the target service, and update the service data of the target service based on the result of processing the target service.

8. A non-transitory, computer-readable medium storing one or more instructions executable by a computer system to perform one or more operations for data processing, comprising:

acquiring service data of a target service by using a trusted application in a trusted execution environment (TEE) when obtaining a service processing request of the target service, generating a service session key corresponding to the target service, and transferring the service data of the target service and the service session key to a secure element, wherein the secure element is encryption hardware-based;

encrypting the service data of the target service in the secure element based on the service session key to obtain service ciphertext information, and encrypting the service session key based on a target service key to obtain a service session key ciphertext, wherein the target service key and a key identifier of the target service key are received by a terminal device from a server device through a secure channel and transferred to the secure element through the TEE, wherein the terminal device comprises the TEE and the secure element, and wherein the secure channel is a channel established between the secure element of the terminal device and the server device based on a same channel establishment rule as that of the server device;

generating a service identity key based on a user identifier of a target user and a pre-stored device identity key in the secure element, wherein the user identifier of the target user comprises a name of the target user or an account number of the target user;

obtaining first signature information based on the service data of the target service and the service identity key; and sending the key identifier of the target service key, the service ciphertext information, the first signature information, and the service session key ciphertext to the server device, wherein the key identifier of the target service key is used to trigger the server device to determine the target service key, the target service key is used to trigger the server device to decrypt the service session key ciphertext to obtain the service session key, and the service session key is used to trigger the server device to decrypt the service ciphertext information to obtain the service data of the target service so as to perform service processing on the target service based on the service data of the target service.

9. The non-transitory, computer-readable medium of claim 8, wherein, before acquiring service data of a target service by using a trusted application in a trusted execution environment (TEE) when obtaining a service processing request of the target service:

establishing, by the secure element, the secure channel with the server device based on the same channel establishment rule as that of the server device;

receiving a service key and a key identifier of the service key sent by the server device through the secure channel, and transferring the service key, as a stored service key, and the key identifier of the service key to the secure element through the TEE; and the encrypting the service session key based on a target service key to obtain a service session key ciphertext comprises:

acquiring the target service key corresponding to the target service from the stored service key, and encrypting the service session key based on the target service key to obtain the service session key ciphertext.

10. The non-transitory, computer-readable medium of claim 8, wherein acquiring service data of a target service by using a trusted application in a trusted execution environment (TEE) when obtaining a service processing request of the target service, comprises:

establishing, by the secure element, the secure channel with the server device based on the same channel establishment rule as that of the server device when obtaining the service processing request of the target service;

receiving the target service key corresponding to the target service and the key identifier of the target service key sent by the server device through the secure channel, and transferring the target service key and the key identifier of the target service key to the secure element through the TEE; and acquiring the service data of the target service by using the trusted application in the TEE.

11. The non-transitory, computer-readable medium of claim 9, wherein transferring the service data of the target service and the service session key to the secure element comprises:

receiving a device identity certificate of the terminal device sent by the server device through the secure channel with the secure element, and transferring the device identity certificate of the terminal device, the service data of the target service, and the service session key to the secure element; and the encrypting the service data of the target service based on the service session key to obtain service ciphertext information comprises:

encrypting the device identity certificate of the terminal device and the service data of the target service based on the service session key to obtain the service ciphertext information.

12. The non-transitory, computer-readable medium of claim 11, wherein, before sending the key identifier of the target service key, the service ciphertext information, and the service session key ciphertext to the server device:

the obtaining first signature information based on the service data of the target service and the service identity key comprises:

signing the service data of the target service, the device identity certificate of the terminal device, and the key identifier of the service key based on the service identity key to obtain the first signature information; and the sending the key identifier of the service key, the service ciphertext information, and the service session key ciphertext to the server device comprises:

sending the key identifier of the service key, the service ciphertext information, the first signature information, and the service session key ciphertext to the server device, wherein the first signature information is used to trigger the server device to perform signature authentication on the terminal device.

13. The non-transitory, computer-readable medium of claim 8, wherein the one or more operations for data processing comprise:

receiving an encrypted result of processing the target service returned by the server device.

14. The non-transitory, computer-readable medium of claim 13, wherein the one or more operations for data processing comprise:

sending, by the trusted application in the TEE, the encrypted result of processing the target service to the secure element by using an application protocol data unit (APDU) instruction, wherein the encrypted result of processing the target service is used to trigger the terminal device to decrypt the encrypted result of processing the target service in the secure element to obtain a result of processing the target service, and update the service data of the target service based on the result of processing the target service.

15. A computer-implemented system for data processing, comprising:

one or more computers; and one or more computer memory devices interoperably coupled with the one or more computers and having tangible, non-transitory, machine-readable media storing one or more instructions that, when executed by the one or more computers, perform one or more operations, comprising:

acquiring service data of a target service by using a trusted application in a trusted execution environment (TEE) when obtaining a service processing request of the target service, generating a service session key corresponding to the target service, and transferring the service data of the target service and the service session key to a secure element, wherein the secure element is encryption hardware-based;

encrypting the service data of the target service in the secure element based on the service session key to obtain service ciphertext information, and encrypting the service session key based on a target service key to obtain a service session key ciphertext, wherein the target service key and a key identifier of the target service key are received by a terminal device from a server device through a secure channel and transferred to the secure element through the TEE, wherein the terminal device comprises the TEE and the secure element, and wherein the secure channel is a channel established between the secure element of the terminal device and the server device based on a same channel establishment rule as that of the server device;

generating a service identity key based on a user identifier of a target user and a pre-stored device identity key in the secure element, wherein the user identifier of the target user comprises a name of the target user or an account number of the target user;

obtaining first signature information based on the service data of the target service and the service identity key; and sending the key identifier of the target service key, the service ciphertext information, the first signature information, and the service session key ciphertext to the server device, wherein the key identifier of the target service key is used to trigger the server device to determine the target service key, the target service key is used to trigger the server device to decrypt the service session key ciphertext to obtain the service session key, and the service session key is used to trigger the server device to decrypt the service ciphertext information to obtain the service data of the target service so as to perform service processing on the target service based on the service data of the target service.

16. The computer-implemented system of claim 15, wherein, before acquiring service data of a target service by using a trusted application in a trusted execution environment (TEE) when obtaining a service processing request of the target service:

establishing, by the secure element, the secure channel with the server device based on the same channel establishment rule as that of the server device;

receiving a service key and a key identifier of the service key sent by the server device through the secure channel, and transferring the service key, as a stored service key, and the key identifier of the service key to the secure element through the TEE; and the encrypting the service session key based on a target service key to obtain a service session key ciphertext comprises:

acquiring the target service key corresponding to the target service from the stored service key, and encrypting the service session key based on the target service key to obtain the service session key ciphertext.

17. The computer-implemented system of claim 15, wherein acquiring service data of a target service by using a trusted application in a trusted execution environment (TEE) when obtaining a service processing request of the target service, comprises:

establishing, by the secure element, the secure channel with the server device based on the same channel establishment rule as that of the server device when obtaining the service processing request of the target service;

receiving the target service key corresponding to the target service and the key identifier of the target service key sent by the server device through the secure channel, and transferring the target service key and the key identifier of the target service key to the secure element through the TEE; and acquiring the service data of the target service by using the trusted application in the TEE.

18. The computer-implemented system of claim 16, wherein transferring the service data of the target service and the service session key to the secure element comprises:

receiving a device identity certificate of the terminal device sent by the server device through the secure channel with the secure element, and transferring the device identity certificate of the terminal device, the service data of the target service, and the service session key to the secure element; and the encrypting the service data of the target service based on the service session key to obtain service ciphertext information comprises:

encrypting the device identity certificate of the terminal device and the service data of the target service based on the service session key to obtain the service ciphertext information.

19. The computer-implemented system of claim 18, wherein, before sending the key identifier of the target service key, the service ciphertext information, and the service session key ciphertext to the server device:

the obtaining first signature information based on the service data of the target service and the service identity key comprises:

signing the service data of the target service, the device identity certificate of the terminal device, and the key identifier of the service key based on the service identity key to obtain the first signature information; and the sending the key identifier of the service key, the service ciphertext information, and the service session key ciphertext to the server device comprises:

sending the key identifier of the service key, the service ciphertext information, the first signature information, and the service session key ciphertext to the server device, wherein the first signature information is used to trigger the server device to perform signature authentication on the terminal device.

20. The computer-implemented system of claim 15, wherein the one or more operations comprise:

receiving an encrypted result of processing the target service returned by the server device.

* * * * *